(12) United States Patent
Chang et al.

(10) Patent No.: US 6,719,506 B2
(45) Date of Patent: Apr. 13, 2004

(54) GANTRY TYPE HYBRID PARALLEL LINKAGE FIVE-AXIS MACHINE TOOL

(75) Inventors: Tsann-Huei Chang, Taichung (TW); Kuan-Wen Chen, Taichung (TW); Chao-An Kang, Taichung Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 240 days.

(21) Appl. No.: 10/011,487

(22) Filed: Dec. 11, 2001

(65) Prior Publication Data

US 2003/0077139 A1 Apr. 24, 2003

(30) Foreign Application Priority Data

Oct. 18, 2001 (TW) ........................................ 90217777 U

(51) Int. Cl.⁷ ................................................. B23C 1/12
(52) U.S. Cl. ........................ 409/201; 409/216; 409/202; 409/134; 409/137; 409/211; 74/490.03; 74/490.06
(58) Field of Search ................... 409/201, 204, 409/211, 216, 235, 202, 212, 134; 408/234, 202, 201, 211, 212, 216; 74/490.01, 490.03, 490.06

(56) References Cited

U.S. PATENT DOCUMENTS

| 4,621,407 | A | * | 11/1986 | Suzuki | 483/56 |
|---|---|---|---|---|---|
| 5,333,514 | A | * | 8/1994 | Toyama et al. | 74/490.06 |
| 5,340,247 | A | * | 8/1994 | Cuneo et al. | 409/202 |
| 5,429,460 | A | * | 7/1995 | Campian | 409/137 |
| 5,715,729 | A | * | 2/1998 | Toyama et al. | 74/490.03 |
| 5,911,888 | A | * | 6/1999 | Girardin | 219/69.11 |
| 5,941,128 | A | * | 8/1999 | Toyama et al. | 74/490.06 |
| 6,048,143 | A | | 4/2000 | Chang et al. | |
| 6,068,431 | A | * | 5/2000 | Line | 409/202 |
| 6,099,217 | A | * | 8/2000 | Wiegand et al. | 409/201 |
| 6,161,992 | A | * | 12/2000 | Holy et al. | 409/134 |
| 6,254,317 | B1 | * | 7/2001 | Chang | 408/1 R |
| 6,428,453 | B1 | * | 8/2002 | Hoppe et al. | 483/58 |

FOREIGN PATENT DOCUMENTS

JP          01146631 A   *   6/1989   ............ B23Q/1/00

* cited by examiner

Primary Examiner—Erica Cadugan
Assistant Examiner—Dana Ross
(74) Attorney, Agent, or Firm—Rabin & Berdo, P.C.

(57) ABSTRACT

Disclosed herein is a gantry type hybrid parallel linkage five-axis machine tool composed of a machine framework a parallel spatial linkage mechanism, a feeding shaft mechanism, and a controller unit. The parallel spatial linkage mechanism is formed of three straight feeding molding dies rotatably hinged together with a base so that enabling this rotatable base to perform uni-dimensional linear motion and two-dimensional swiveling. Besides by controlling the operation of the feeding shaft mechanism with the controller unit, the parallel spatial linkage mechanism fixed to the machine framework is able to perform two-dimensional planar motion so as to operate the machine tools more accurately and efficiently in refining work.

13 Claims, 10 Drawing Sheets

GANTRY TYPE HYBRID PARALLEL LINKAGE FIVE-AXIS MACHINE TOOL

BACKGROUND OF THE INVENTION

1. Field of the Invention

The present invention relates to a gantry type hybrid parallel linkage 5-axis machine tool, in particular, to a high efficiency machine tool having at least five dimensional axis moving directions composed of a parallel spatial linkage mechanism and a gantry type framework.

2. Description of the Prior Art

In bygone time, the conventional gantry type 5-axis machine tools are all in a form of serially linked feeding mechanism in which a linear feeding shaft and a rotating shaft are laid overlapping. Referring to FIGS. 1(A) and 1(B), wherein FIG. 1(A) is a gantry type 5-axis machine tool presently in mass production by PARPAS Co., and FIG. 1(B) shows its main shaft head in possession of two independently rotatable directions(A/C axes rotational direction). This type of machine tool is the most commonly adopted gantry type 5-axis machine tool. In this machine tool, the X axis feeding control is carried out by movement of a main shaft head base along a transverse beam; the Y axis feeding control is carried out by movement of the transverse beam along a U shaped structure; While the Z axis feeding control is carried out by movement of the head base. As for the directional adjustment of the A/C axis is controlled by the rotatable main shaft head shown in FIG. 1(B). Hence, the scheme of the gantry type 5-axis machine tool shown in FIG. 1(A) is basically a serially banked mechanism with rigidity like a serially jointed spring. In case there is a component with insufficient rigidity, the rigidity of the whole serial system will be degraded.

Fatal shortcomings of such a serial mechanism exist in its excessive cantilever length that brings about too long of loading path, less rigidity, susceptible to yielding to bending moment, and the thermally non-symmetric structure which often causes restriction to system dynamic frequency range disadvantageous to high speed operation. Putting the structure in a rough finish condition is a usual remedy of solving the problem. However, the machine constructed as such requires greater driving force to activate the feeding mechanism resulting in greater power consumption and increasing production cost. At present, notwithstanding the geometrical errors in machine dimensions and the thermal deformation etc. can be compensated through computer numerical control (CNC) technology so as to upgrade the machine accuracy for a serially constructed machine tool with such a less costly computer software, it is a primary consideration that whether the machine is of sufficient repeatability, (i.e., having sufficient rigidity and resistive to low thermal deformation). It is regretful that the present serially constructed machine tools are far from these features.

Meanwhile, it is that one which having a main shaft head composed of two rotational axes has the lowest rigidity yet the highest production cost among the conventional gantry type 5-axis machine tools that causes the serial feeding mechanism applied therefore to suffer from insufficient rigidity and difficulty in high speed operation. Moreover, users have to tolerate a high market price for this type of machine tools. It is therefore the utmost important matter to improve the rigidity of the main shaft head of the above described 5-axis machine tool and reduce its production cost so as to promote the domestic and even the international market growth for the gantry type 5-axis machine tool.

Aiming at the above depicted problems, the present invention is to propose an ingeniously developed construction for a gantry type hybrid parallel linkage five-axis machine tool capable of operating with a satisfactory rigidity, high speed, and less thermal deformation.

SUMMARY OF THE INVENTION

Therefore, it is an object of the present invention to provide a gantry type hybrid parallel linkage 5-axis machine tool wherein by combining the parallel spatial linkage with all types of gantry machine tool so as to palliate the aforesaid defects of the conventional gantry type multi-axis serial machine tools such as long loading path caused by a too long cantilever arm, insufficient rigidity, susceptible to deformation by bending moment, and thermally non-symmetric structure.

It is another object of the present invention to provide a gantry type hybrid parallel linkage 5-axis machine tool with a simple structure easy for assembling yet having a high rigidity and a low inertia suitable for high speed feeding operation thereby upgrading the machine accuracy and widening the system dynamic frequency region.

For achieving aforesaid objects, the gist of the present invention is to apply my "Hybrid structural Multi-Axis machine Tool" disclose in Patent Gazette No. 363480 Taiwan ROC, and "Composite Mechanism Multi-Axis Machine Tool" disclosed in U.S. Pat. No. 6,048,143, for all types of gantry structural machine tool so as to improve the operation speed of the feeding mechanism of the gantry type machine tool well utilizing the high rigidity and the low inertia features of a parallel spatial linkage mechanism.

The present invention essentially comprises: A pedestal with at least two parallel linear guide ways provided at its one surface thereof; and a working platform with two sliding slots provide at its surface facing to the pedestal such that the working platform may move straightly with respect to the pedestal by coupling the two sliding slots with the two linear guide ways. A machine framework is at least composed of a planar roof and two supporting columns, the end portions of the columns are parallelly fixed to both sides of the pedestal, and the surfaces of the other two end portions are each provided with a linear guide way. Besides, a sliding slot is formed at each side of the planar roof such that the planar roof is able to make straight linear motion with respect to the columns by coupling the two sliding slots with the two linear guide ways on the end portion s of the columns. A hollow guide hood is secured its one end to one side of the planar roof, and the other end extending towards the pedestal. A parallel spatial linkage mechanism formed of a plurality of straight feeding molding dies are parallelly in connection with a base in the way that the individual molding die is able to swivel freely, and that each molding die is connected with the base in an indivisual position. By so the base is able to make at least two dimensional swiveling driven by those straight feeding molding dies. Each straight feeding molding die includes a linear guide way, a sliding base, and a connecting rod, the sliding base can move linearly along the linear guide way, the connecting rod can at least make an uni-dimensional swiveling with its one end hinged to the sliding base in the version that forming a hinge pin at the rod side while forming a corresponding bearing on the sliding base side such that the other end of the connecting rod is able to make uni-dimensional swiveling with respect to the joint on the sliding base as a fulcrum. Besides, the opposite end of the connecting rod may be rotatably hinged to the sliding base with a universal shaft coupling or a ball joint. With this structure the sliding base is able to make at least unidimensional displacement and two dimensional swiveling thus altogether three dimensional movement is possible. A refining molding unit is installed on a side surface of the Pedestal facing to the working platform. The refining molding unit is a cutting equipment having cutting tools Provided at its one end thereof capable of cutting and refining a work piece gripped on the working platform. Besides, this refining molding unit may also be a welding or supersonic bonding equipment. A feeding shaft mechanism is for driving above mentioned planar roof to make uni-dimensional movement along the linear guide ways. A controller is for controlling and coordinating the operation of parallel spatial linkage mechanism with the feeding shaft mechanism, and adjusting the relative position between the refining molding unit and the working platform.

Meanwhile, in the present invention, the aspect of assembling the pedestal, the working platform, the machine framework and the guide hood can be varied in many respect for matching with the parallel spatial linkage so as to serve effectively as a parallel spatial linkage mechanism. If the working platform is secured to one surface of the pedestal, and one end portion of each column is parallelly fixed to each side of the pedestal respectively, whereas the other end portion of each column is provided with a linear guide way which is able to match its own corresponding linear guide way so as to enable the planar roof to make uni-dimensional movement (Y axis direction). And, other two linear guide ways are formed on the other end surfaces of both columns. The former two linear guide ways and the latter two linear guide ways respectively make their projections on X ais and Y axis planes perpendicular to each other thereby guiding hood is able to make uni-dimensional movement (X axis direction) by the two sliding slots formed on it to slide on the two linear guide ways provided on the planar roof. And, further modification is possible with the structure that the two linear guide ways formed on the pedestal facing to ∩ shaped machine framework and the two linear guide ways formed on the planar roof make projection on the XY axis planes perpendicular to each other such that the working platform is able to make uni-dimensional movement in X axis direction by coupling the two sliding slots formed on the bottom of the working platform with the two linear guide ways formed on the pedestal.

BRIEF DESCRIPTION OF THE DRAWINGS

To enable a further understanding of the innovative and technological content of the invention herein, refer to the detailed description of the invention and the accompanying brief description of the drawings.

DETAILED DESCRIPTION OF THE PREFERRED EMBODIMENT

Figure 1A:
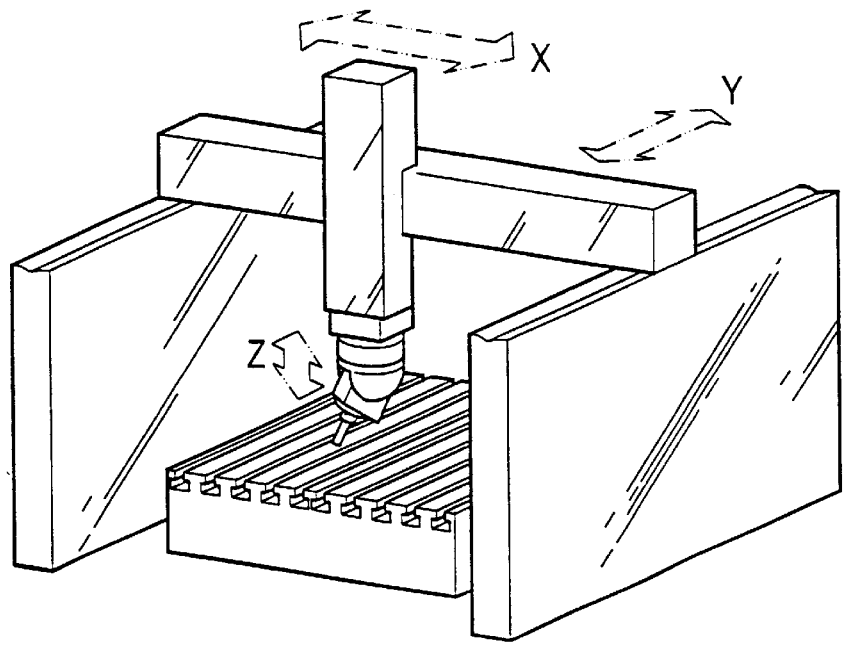
FIG. 1(A) is a three dimensional view of a conventional gantry type five-axis machine tool.
Figure 1B:
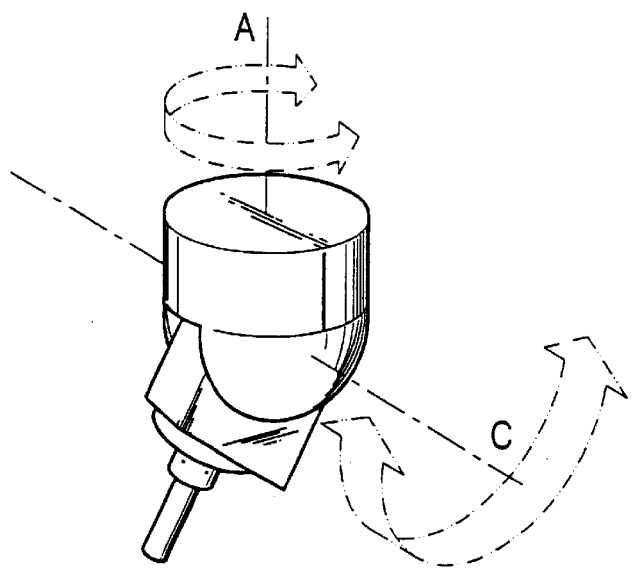
FIG. 1(B) is an illustrative view of a main shaft head of a conventional gantry type five-axis machine tool.
Figure 2:
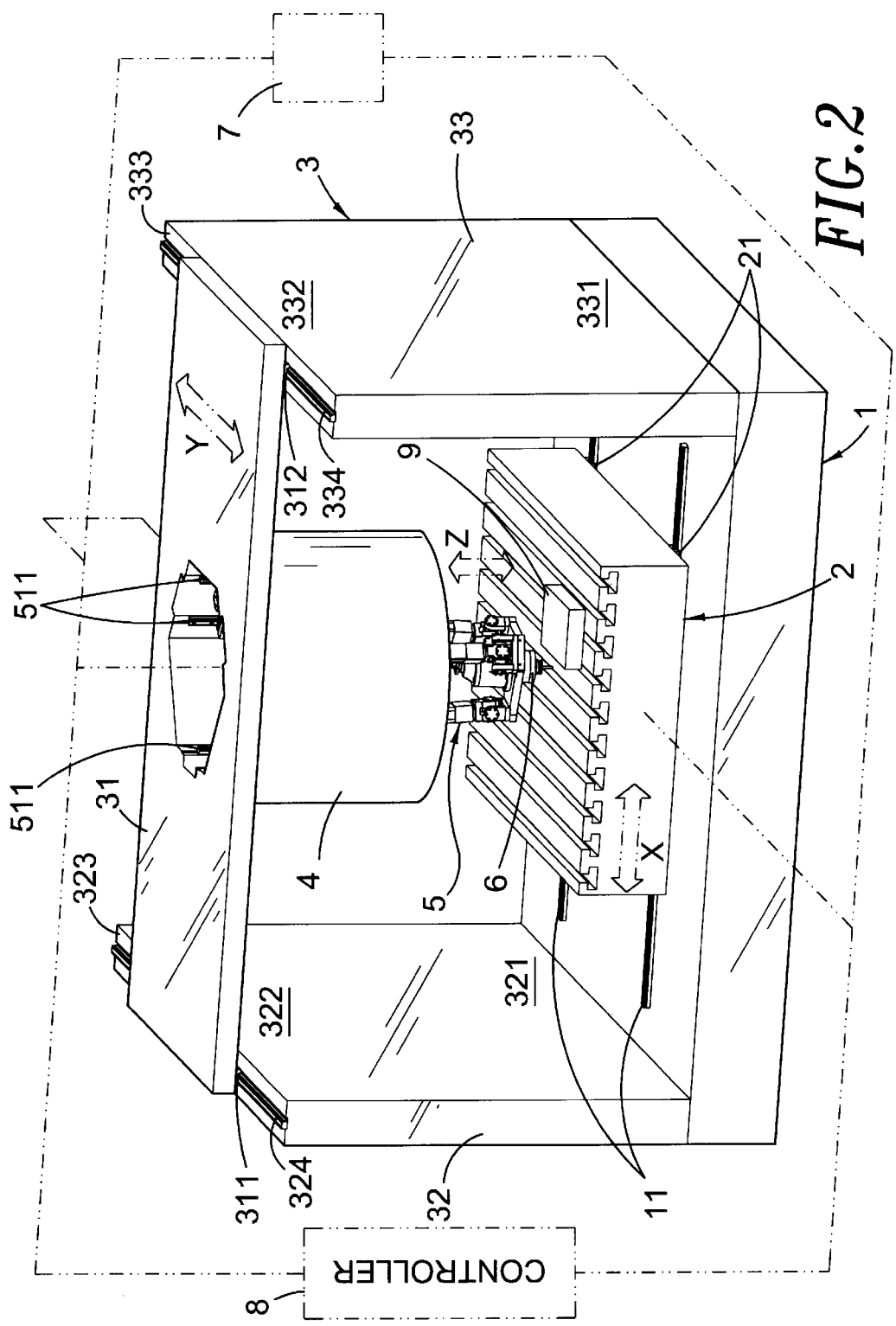
FIG. 2 is a three dimensional view of the present invention.
Figure 3:
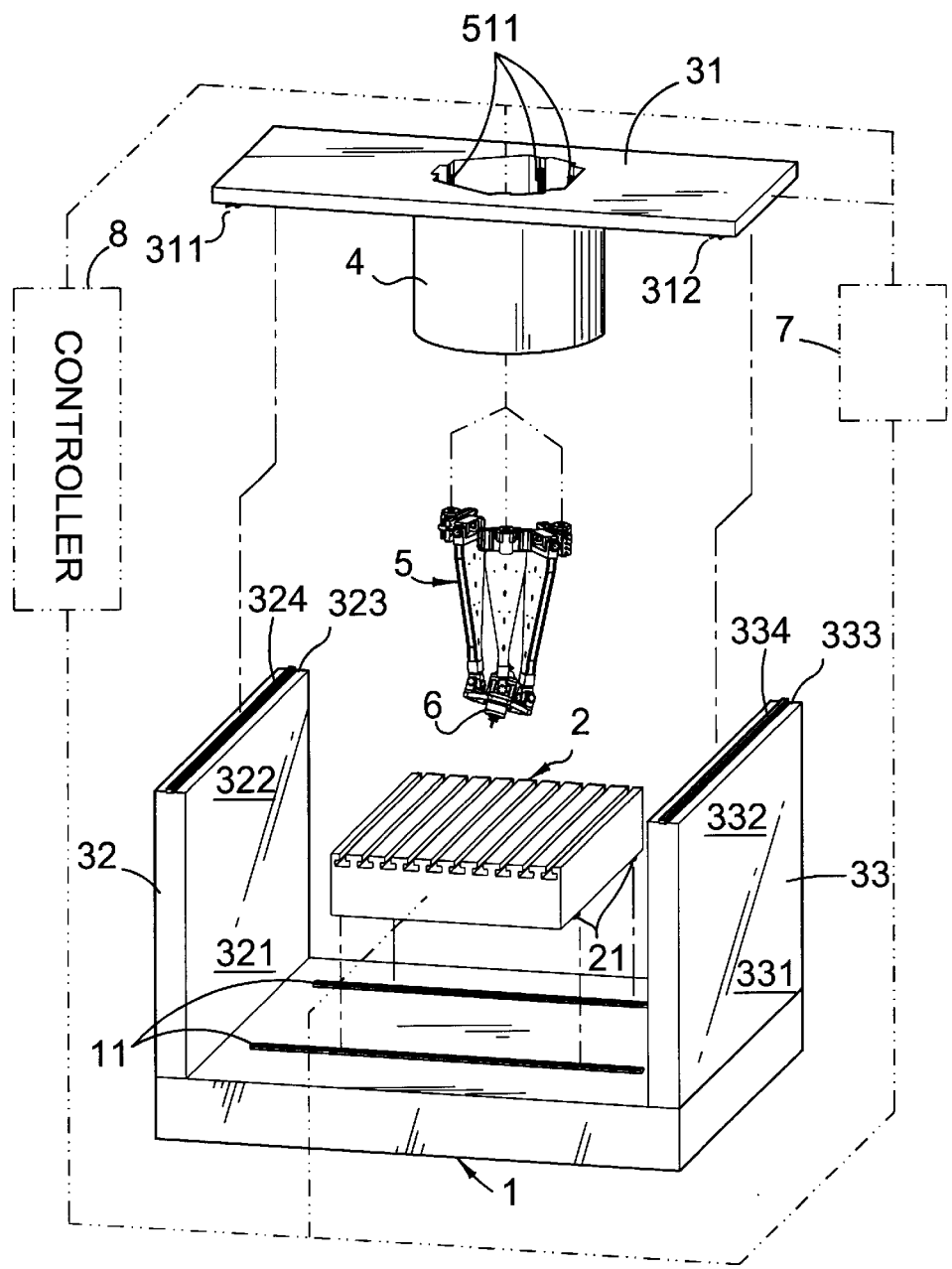
FIG. 3 is a three dimensional exploded view of the present invention for illustration.
Figure 4:
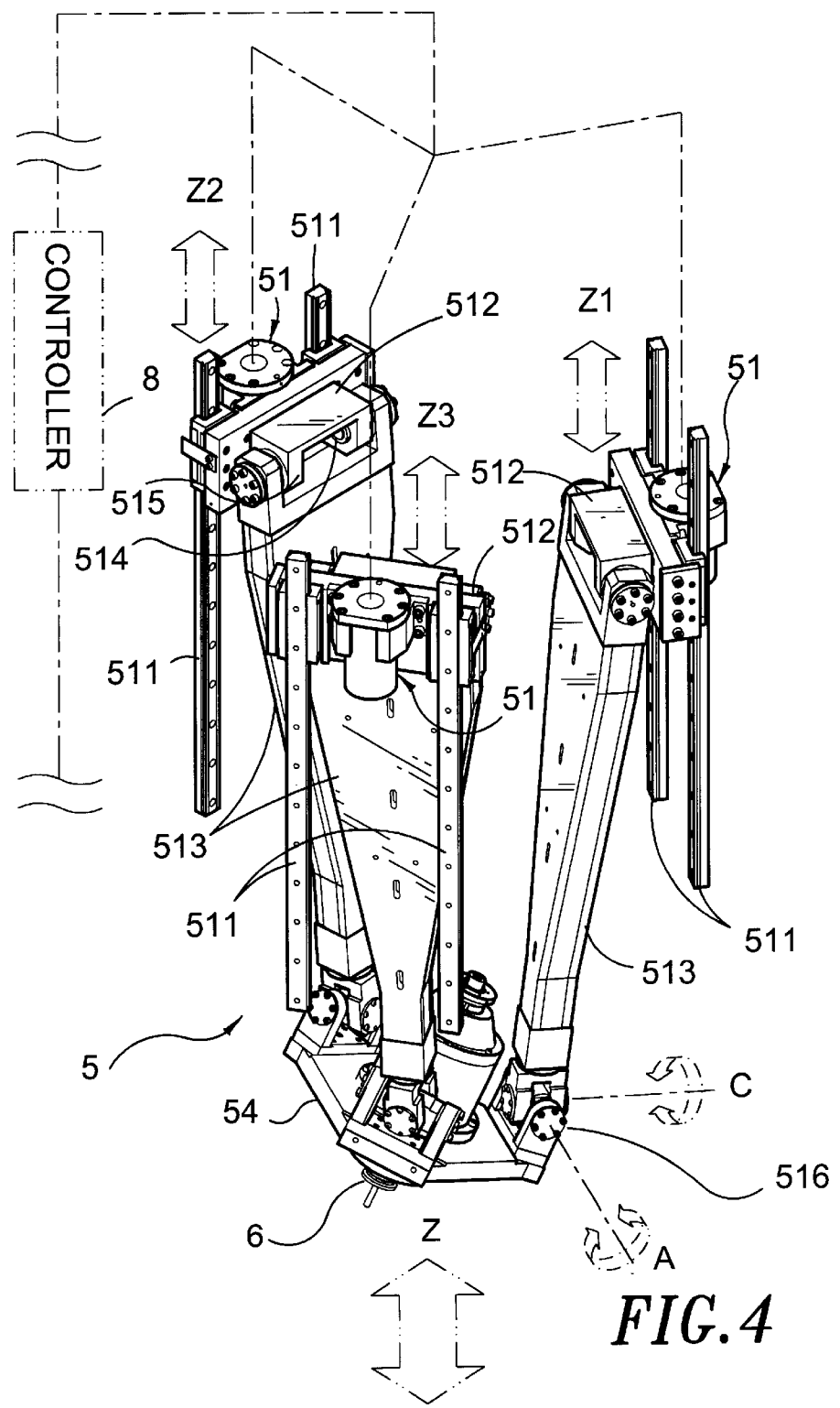
FIG. 4 is a three dimensional view of the parallel spatial linkage mechanism used in the present invention.
Figure 4A:
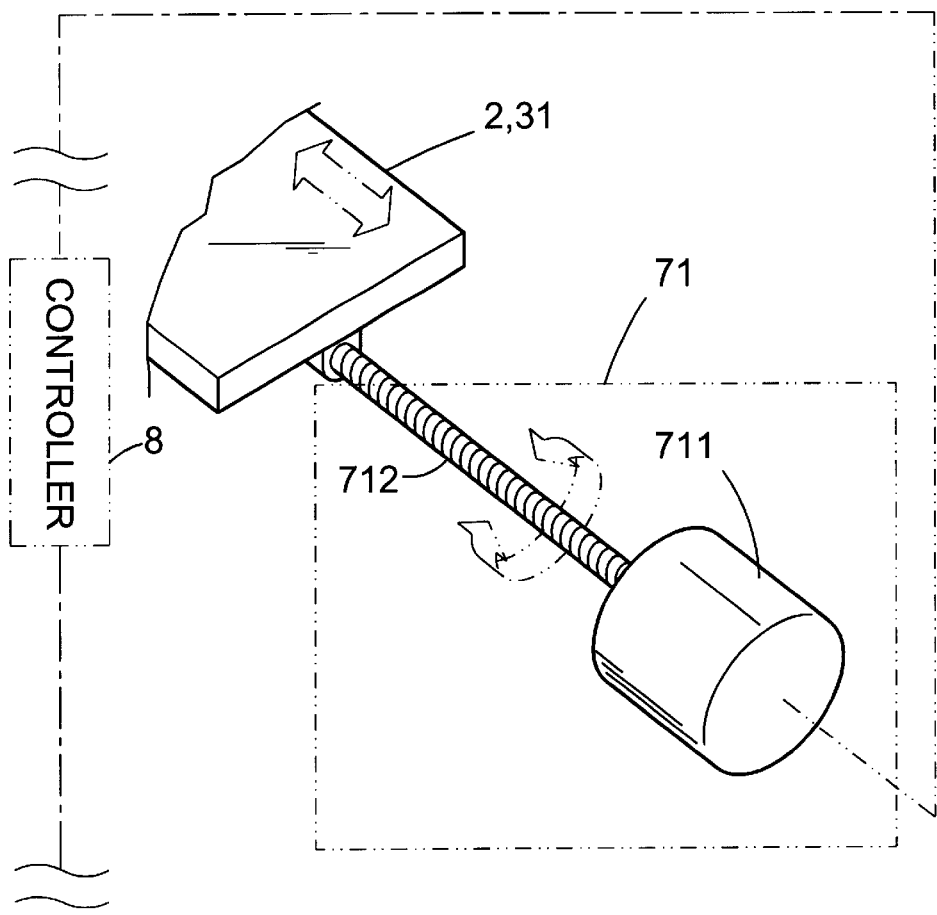
FIGS. 4A and 4B are illustrative views showing the transferring way of the feeding shaft mechanism in an embodiment of the present invention.
Figure 4B:
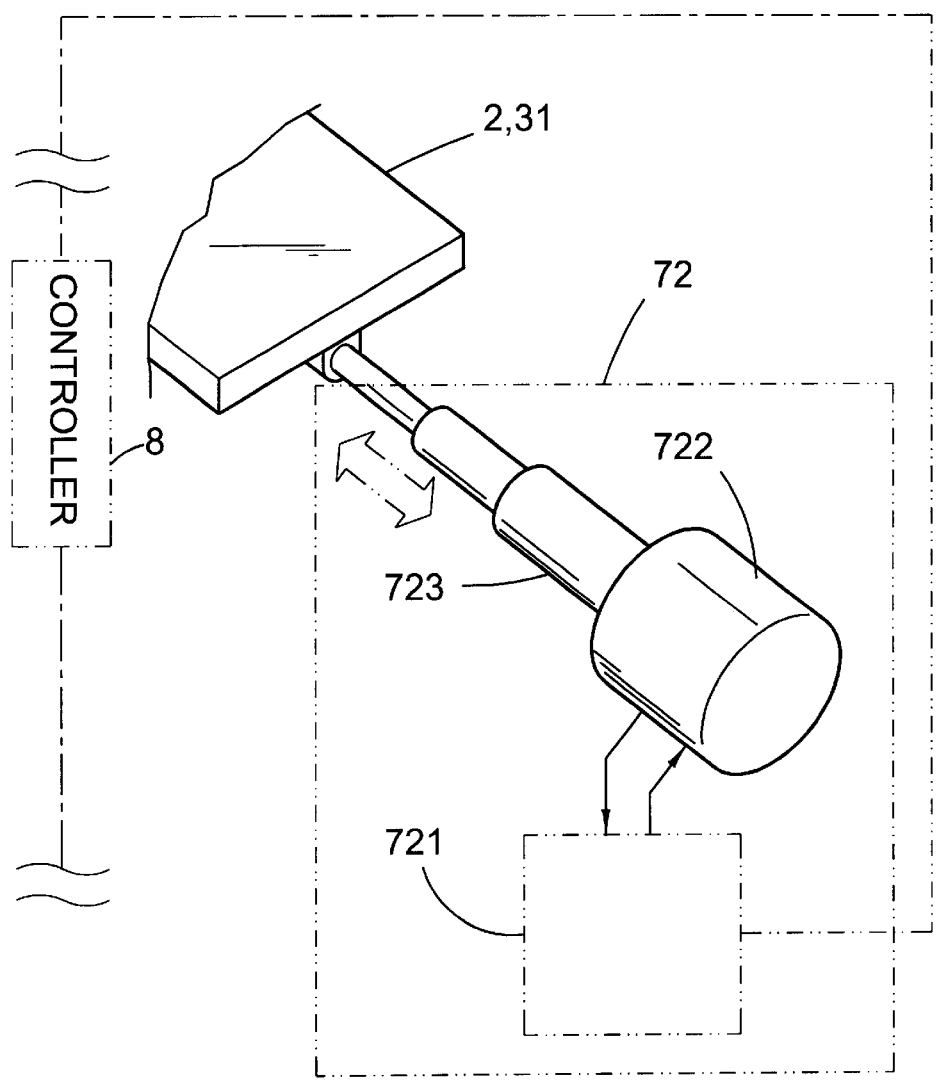

Referring to FIG. 2 through FIG. 4 FIG. 2 is a three dimensional view of the present invention, and also is a drawing of an embodiment of the present invention. FIG. 3 is a three dimensional exploded view of the present invention for illustration purpose, and FIG. 4 shows a three dimensional view of the parallel spatial linkage mechanism used in the present invention. In the present invention, a pedestal 1 used for entraining all component parts of the present invention on the ground is provided. The other components are a working platform 2, a machine framework 3, a guide hood 4, a parallel spatial linkage mechanism 5, a refining molding unit 6, a feeding shaft mechanism 7, and a controller 8. There are at least two parallel linear guide ways 11 provided at one surface of the pedestal 1, and two sliding slots 21 are provided at one surface of the working platform 2 facing to the pedestal 1 such that the working platform 2 may move straightly with respect to the pedestal 1 by coupling the two sliding slots 21 with the two linear guide ways 11. The machine framework 3 is composed of a planar roof 31 and two supporting columns 32, 33. The end portions 321,331 of the columns 32,33 are parallelly fixed to both sides of the pedestal 1, and the surfaces 323,333 of the other two end portions 322,332 are provided with linear guide ways 324,334 respectively. Besides, sliding slots 311,312 are formed at both sides of the planar roof 31 respectively such that the planar roof 31 is able to make straight linear motion (Y axis direction) with respect to the columns 32,33 by coupling the two sliding slots 311,312 with the two linear guide ways 324,334 on the end portions 322,332 when the planar roof 31 is driven by the feeding shaft mechanism 7. The guide hood 4 is made hollow with its one end secured to one side of the planar roof 31 facing to the pedestal 1, and the other end is extending towards the pedestal 1. The parallel spatial linkage mechanism 5 formed of three straight feeding molding units 51 parallelly in connection with a base 54 is installed in the guide hood 4. All of these straight feeding molding units 51 are rotatably hinged to the base 54 at mutually different positions thereof. By these three straight feeding molding units 51 in connection with the base 54 respectively at different positions, the base 54 can make linear motion along Z axis direction, and also make at least two dimensional swiveling motions around A and C axes shown in FIG. 4. The refining molding unit 6 is installed on a side surface of the pedestal 1 facing to a side surface of the working platform 2. The feeding shaft mechanism 7 is for driving the aforesaid sliding slots 21,311 and 312 on the planar roof 31 and working platform 2 so as to couple them with the linear guide ways 11,324 and 334 thereby making uni-dimensional (X axis or Y axis) linear motion. As for the driving means for planar roof 31 or the working platform 2 with the feeding shaft mechanism 7, a ball screw driving mechanism 71 employing a screw bolt 712 and its driving servo motor 711, or an oil pressure driving mechanism 72 for controlling an oil pressure circuit 721 to drive a transmission rod 723 with an oil pressure cylinder 722, is applicable to move the planar roof 31 or the working platform 2. Referring to FIGS. 4(A) and 4(B), the controller 8 is for controlling and coordinating the operation of the straight feeding molding units 51 of the parallel spatial linkage mechanism 5 and the feeding shaft mechanism 7 so as to change the spatial azimuth of the base 54 thereby adjusting the relative position between the refining molding unit 6 and the working platform 2.

Figure 4C:
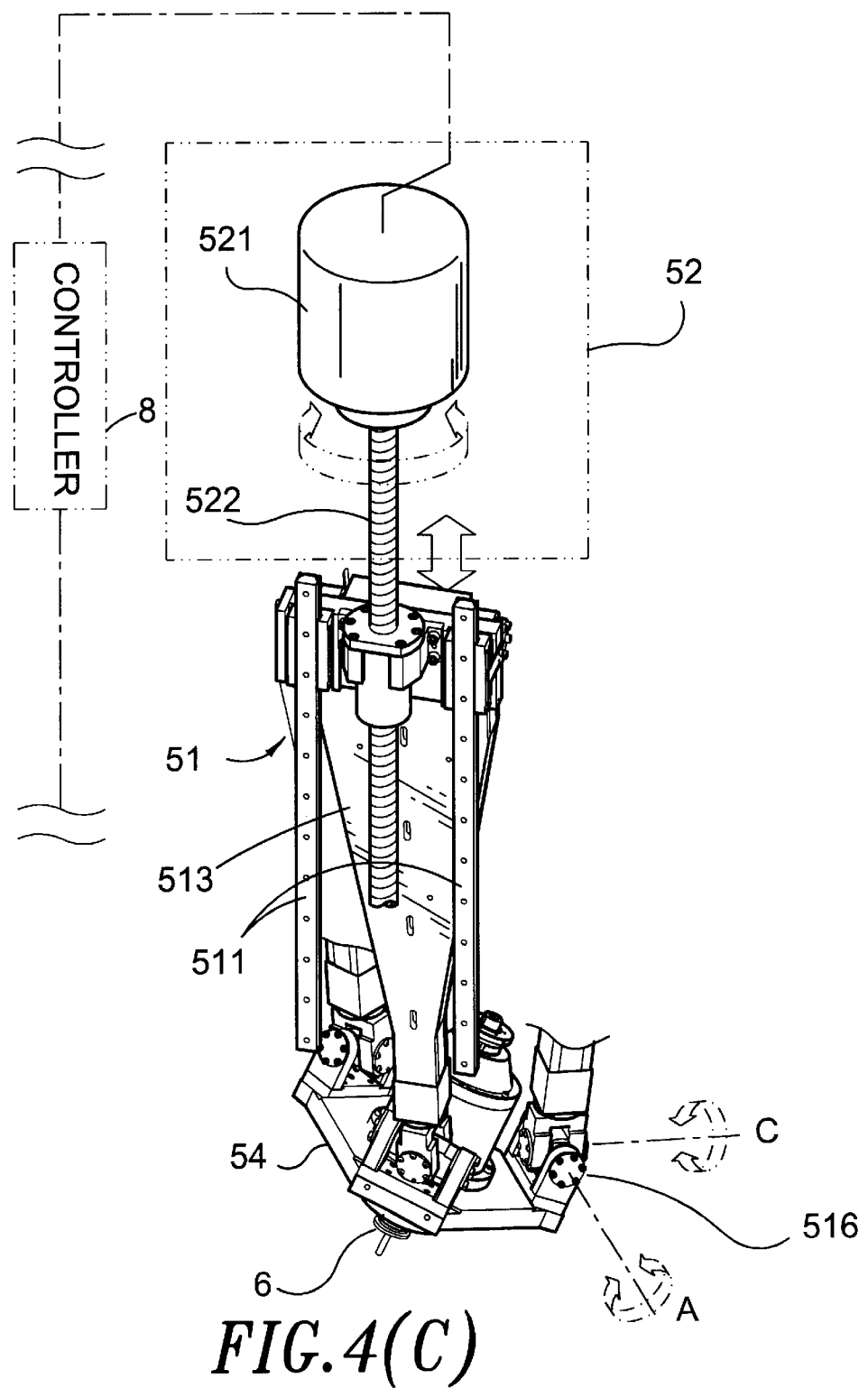
FIGS. 4C and 4D are illustrative views showing the transferring way of the straight feeding molding unit in an embodiment of the present invention.
Figure 4D:
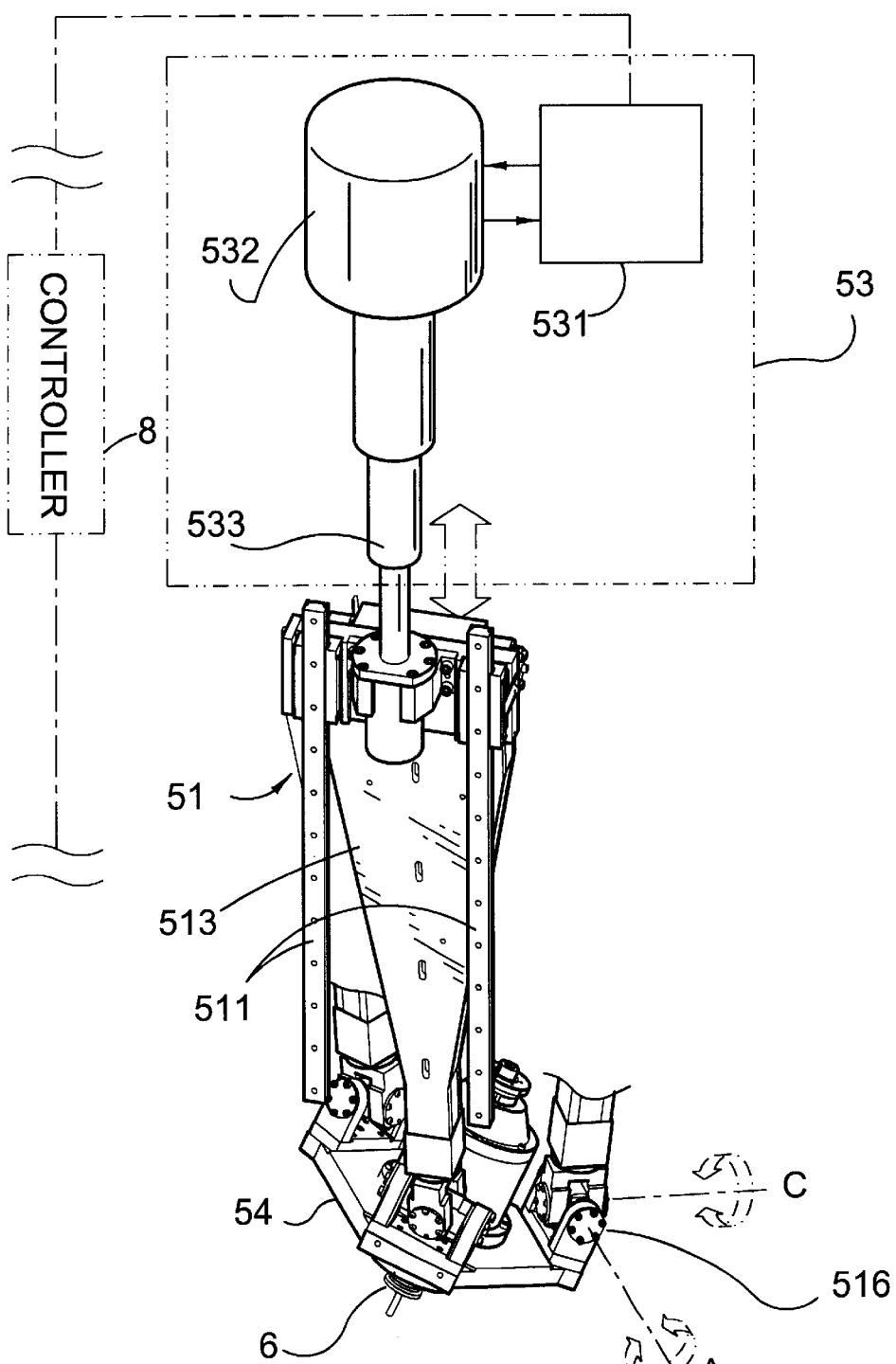

Referring again to FIG. 4, each straight feeding molding unit 51 in the parallel spatial linkage mechanism 5 (herein referred to a single molding unit 51, and should there be a plurality of straight feeding molding units, they are similarly constructed) includes a linear guide way 511, a sliding base 512, and a connecting rod 513. The linear guide ways 511 are parallelly disposed with a relevant separation along the inner surface of guide hood 4. The connecting rods 513 are conjoined to the circumference of the base 54 at different positions equally separated. The sliding bases 512 can move linearly along the linear guide ways 511 in the directions along the Z1 axis, Z2 axis, and Z3 axis shown in FIG. 4. Each connecting rod 513 is hinged to the sliding base 512 with its one end so as to be able to make at least uni-dimensional swiveling, while its other end thereof also can be rotatably hinged to the base 54. By connecting the connecting rods 513 of three straight feeding molding dies 51 to the base 54 at different positions, and coupling respective sliding bases 512 with their corresponding linear guide ways 511 for performing linear motion, the base 54 is able to carry out uni-dimensional linear motion (Z in the axis direction), and two-dimensional (A/C axes) swiveling, for three-dimensional motion altogether. As for the way the straight feeding molding unit 51 drives the sliding base 512 to move linearly along the linear guide way 511 for driving the planar roof 31 or the working platform 2, a ball screw mechanism 52 (i.e., a servo motor 521 for driving a screw bolt 522), or an oil pressure driving mechanism 53 (i.e., an oil pressure circuit 531 to drive a transmission rod 533 with an oil pressure cylinder 532) is applicable as shown in FIGS. 4(C) and 4(D).

How to make a hinged joint between the connecting rod 513 and the sliding base 512 will be illustrated as follows. A hinge pin 514 is formed at one end of the rod 513, while a corresponding bearing 515 is formed on the sliding base 512 such that the other end of the connecting rod 513 is able to make a uni-dimensional revolution with respect to the joint made on the sliding base 512 as a fulcrum. Meanwhile the joint of the connecting rod 513 to the base 54 can be carried out with a universal shaft coupling 516. The universal shaft coupling 516 is composed of two units of shaft and bearing with an intersected center of axes. With this structure, the base 54 is able to make at least a two-dimensional swiveling motion with respect to the jointed point of the rod 513 with the base 54 as a fulcrum. Alternatively, a ball joint may be employed which may serve equivalently as the above mentioned universal shaft coupling 516.

Referring back to FIG. 2 and FIG. 4, the parallel spatial linkage mechanism 5 is composed of three sliding bases 512 capable of straightly moving up and down, the connecting rods 513 hinged to each base 512, the refining molding unit 6 and three universal shafts joint 516 interposed between the refining molding unit 6 and the connecting rods 513. When the three sliding bases 512 move with different speeds or in different speed, or in different directions (Z1, Z2, and Z3), the refining molding unit 6 makes a spatially biased revolution due to swiveling of the universal shaft joint 516 in A/C axes. The controller 8 controls the working information (such as a working position and suppling cutter toots etc.) to be transmitted to the planar roof 31 and the working platform 2 through the feeding shaft mechanism 7, such that the refining molding unit 6 makes two dimensional spatial directional change on X and Y planes with respect to the working piece 9. In case the controller 8 further controls the parallel spatial linkage mechanism 5 to carry out control in the Z axis (the same amount of displacement or speed of the sliding base 512 at Z1, Z2 and Z3 axes directions) and in A/C axes (the different amount of displacement or speed), the refining molding unit 6 will make a biased revolving motion in vertical (Z axis) and A/C axes direction with respect to the working piece 9. In this version, the gantry type hybrid parallel linkage five-axis machine tool of the present invention is able to work the working piece 9 in at least from five spatial directions.

Figure 5:
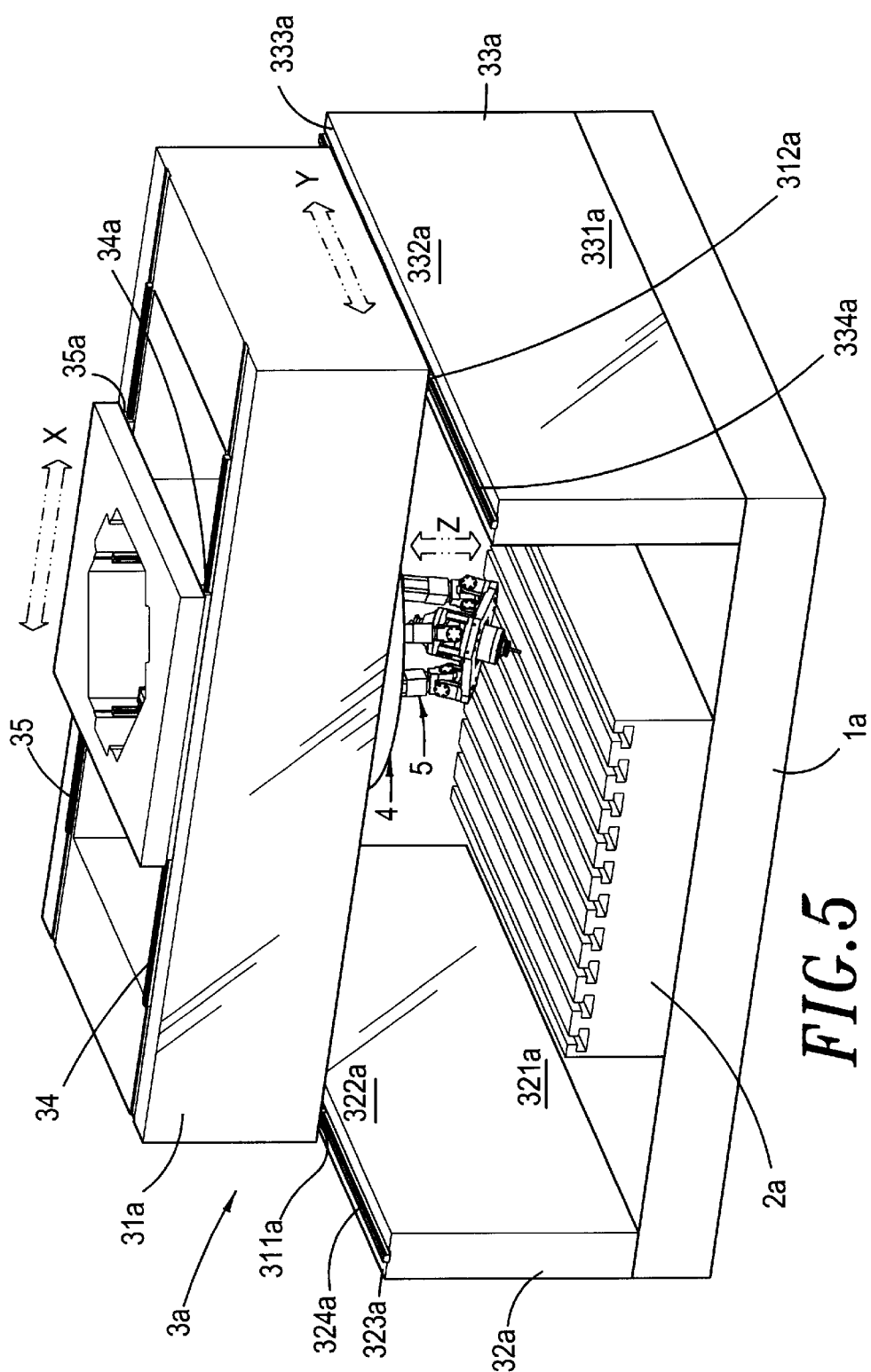
FIG. 5 is an illustrative view in a second embodiment of the present invention.
Figure 6:
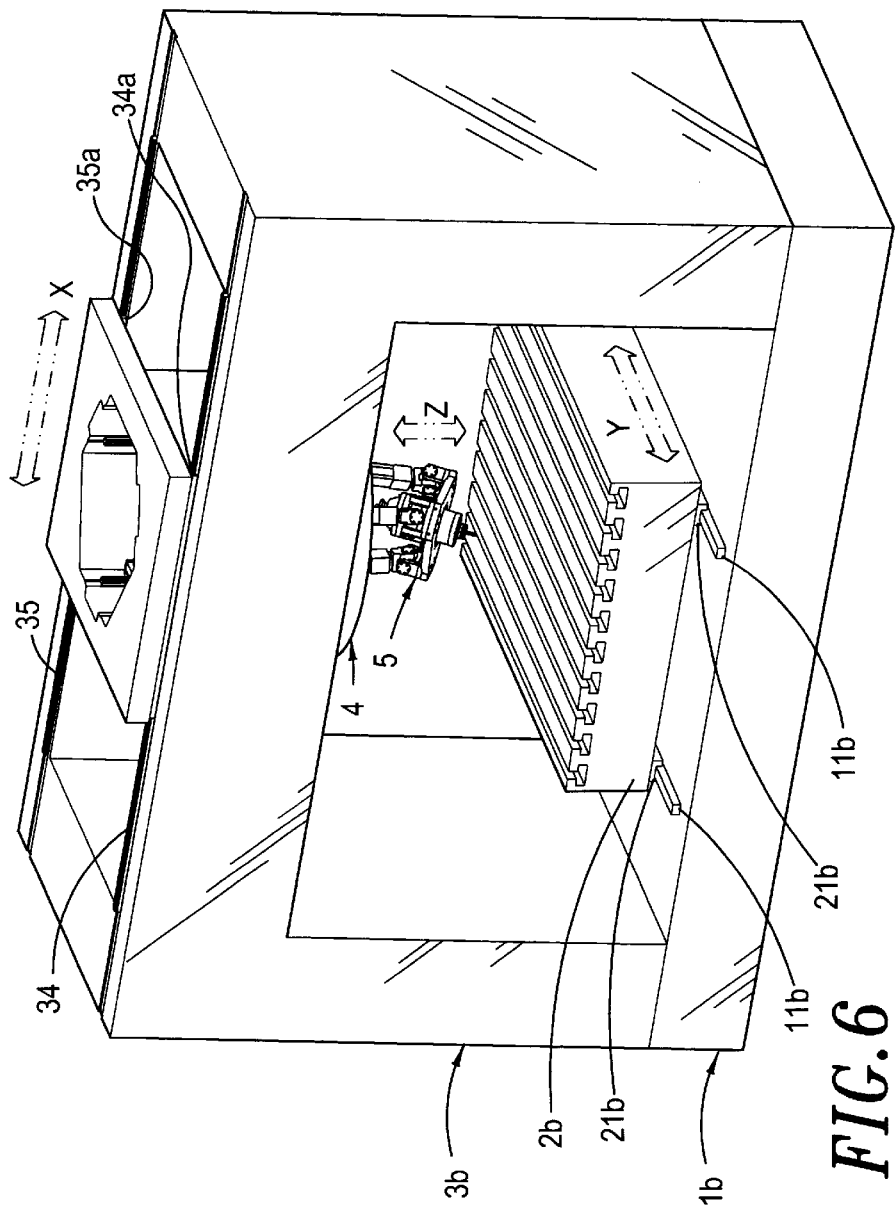
FIG. 6 is an illustrative view in a third embodiment of the present invention.

Referring to FIG. 5 and FIG. 6, an illustrative view of a second embodiment, and an illustrative view of a third embodiment of the present invention respectively are shown. In these two embodiments, the aspect of the pedestal 1, working platform 2, the machine framework 3 and the guide hood 4 are modified so as to improve the effectiveness of the parallel spatial linkage mechanism 5 when it is combined with the above mentioned component. As shown in FIG. 5, a working platform 2a on a machine framework 3a is secured to one surface of a pedestal 1a. Each of the end portions 321a and 331a of two supporting columns 32a and 33a is parallelly fixed to two sides of the pedestal 1a respectively, while each of the end surface 323a or 333a of the other end portions 322a and 332a of the two supporting columns 32a and 33a is respectively provided with a linear guide way 324a or 334a to be coupled with sliding slots 311a or 312a formed on a planar roof 31a so that the planar roof 31a can make uni-dimensional linear motion in the Y axis direction. And, on the other surface of the planar roof 31a where the sliding slots 311a and 312a are formed, there are provided two linear guide ways 34 and 35. These two linear guide ways 34 and 35 and the other two linear guide ways 324a and 334a on the supporting columns 31a form projections on the X and Y axes planes perpendicular to each other. At the time the guide hood 4a is separated from the planar roof 31a, the two sliding slots 34a and 35a which are formed on one side of the originally stationary planar roof 31a may couple with the two linear guide ways 34 and 35 on the planar roof 31a. With this structure, the guide hood 4a is allowed to make uni-dimensional motion in the X axis direction. The above mentioned combination may further be modified in a third embodiment as shown in FIG. 6. Here, the planar roof 31a and two columns 32a and 33a of the machine framework 3a are integrally made into one piece to form a ∩ shaped (inverted U-shape) machine framework 3b, while other two linear guide ways 11b are formed on one surface of a pedestal 1b facing the ∩ shaped machine framework 3b. The two linear guide ways 11b and the two linear guide ways 34 and 35 originally formed on the planar roof 31a make projections on X and Y axes planes perpendicular to each other. Therefore, by coupling additional two sliding slots 21b formed at the bottom of the working platform 2b with the two linear guide ways 11b formed on the pedestal 1b, the working platform 2b is able to make uni-dimensional linear motion in the X axis direction.

(1) Replacing the shaft head of a gantry type five-axis machine tool with a parallel spatial linkage mechanism does not accumulate errors of all driving shafts as that is experienced in the conventional machine tools. On the contrary, it has the effect of balancing the geometrical errors so as to easily achieve high precision effect and bring up the performability for refining complicated curved surface.

(2) The longitudinal stress is mostly allevivated by the driving shaft so that rigidity of the machine is intensified.

(3) Well designed thermal symmetric structure contributes to minimizing thermal deformation.

(4) By reason that the parllel mechanism structure is essentially for withstanding most of the longitudinal stress, its loading capability is stronger than a serially constructed machanism with superior rigidity and less errors.

(5) The production cost of the present invention is less expensive than that of a conventional five-axis machine fool so that the machine tool of the present invention will command a superior competitiveness in the future market.

It is therefore to be understood that the above and other modifications and changed may be readily made in the construction and arrangement of elements comprising the preferred and modified forms of invention without departing form the spirit and scope of the invention as defined by the appended claims and reasonable equivalents thereof.

What is claimed is:

1. A gantry hybrid parallel linkage five-axis machine tool, comprising:

a pedestal;

a working platform secured to a surface of said pedestal;

a machine framework including a planar roof and two supporting columns, said supporting columns being parallel, and having first end portions fixed to opposing sides of said pedestal, and having second end portions, each of the second end portion being provided with a respective linear guide way, said planar roof having a lower surface having sliding slots formed therein, with a respective sliding slot being formed at each end of said roof, the linear guide ways of said supporting columns being coupled with the sliding slots of said planar roof to allow said planar roof to move relative to said two columns and to make a straight linear motion in a Y-axis direction, said roof further having an upper surface having two linear guide ways thereon, said linear guide ways on said roof being perpendicular to said linear guide ways on the second end portions of said supporting columns; hood, said parallel spatial linkage mechanism including a base installed in a guide hood and a plurality of straight feeding molding units connected with said a base, each of said straight feeding molding units being rotatably hinged to said base at mutually different positions thereof, said straight feeding molding units allowing said base to be driven to make at least a two-dimensional swiveling motion;

a refining molding unit installed on a side surface of said base and facing a surface of said working platform;

said guide hood being separate from said planar roof, said guide hood having two sliding slots that are coupled with said two linear guide ways on said planar roof, to allow said guide hood to move in an X-axis direction;

a feeding means for driving said guide hood and said planar roof in the respective X-axis and Y-axis directions; and a controller means for controlling and coordinating an operation of said straight feeding molding units of said parallel spatial linkage mechanism and said feeding means so as to change a spatial azimuth of said base thereby adjusting a relative position between said refining molding unit and said working platform.

2. The machine tool of claim 1, wherein each straight feeding molding unit further includes a linear guide way, a sliding base, and a connecting rod, said sliding base being adapted to move with a linear motion along said liner guide way of said straight feeding molding unit, said connecting rod having one end hinged to said sliding base to allow said connecting rod to uni-directionally swivel, said connecting rod having another end rotatably hinged to said base of said parallel spatial linkage mechanism, each said connecting rod of said plurality of straight feeding molding units being connected to said base of said parallel spatial linkage mechanism at respectively different positions, each said sliding base being coupled with a respective corresponding linear guide way of a respective straight feeding molding unit for performing the linear motions, said base of said parallel spatial linkage mechanism being able to carry out uni-dimensional linear motion in a Z axis direction, and two-dimensional swiveling about an A and a C axis, for a total of three, dimensional motion altogether.

3. The machine tool of claim 2, wherein said linear guide ways of said plurality of straight feeding molding units are fixedly formed in a housing of said guide hood.

4. The machine tool of claim 2, wherein the one end of each said connecting rod is hinged to a respective sliding base using a hinged pin, while a corresponding bearing is disposed on said sliding base such that said connecting rod is able to make at least a uni-dimensional revolution using said hinged pin as a fulcrum.

5. The machine tool of claim 2, wherein the another end of each said connecting rod is hinged to said base of said parallel spatial linkage mechanism using a universal shaft coupling which allows, said base of said parallel spatial linkage mechanism to make the two-dimensional swiveling motion.

6. The machine tool of claim 2, wherein the another end of each said connecting rod is hinged to said base of said parallel spatial linkage mechanism using a ball joint which allows said base of said parallel spatial linkage mechanism to make the two-dimensional swiveling motion.

7. The machine tool of claim 2, wherein there are three of said straight feeding molding units, each of the respective linear guide ways of the straight feeding molding units being parallel to each other and being equally spaced with each other in a housing of said guide hood, and said connecting rods being fixed to a circumference of said base of said parallel spatial linkage mechanism at equally spaced apart and different positions.

8. The machine tool of claim 2, wherein said parallel spatial linkage mechanism includes a ball screw mechanism to drive said sliding base to move with the linear motion.

9. The machine tool of claim 2, wherein said parallel spatial linkage mechanism includes an oil pressure mechanism to drive said sliding base to move with the linear motion.

10. The machine tool of claim 1, wherein each of said straight feeding molding units has a linear guide way fixedly formed in a housing of said guide hood.

11. The machine tool of claim 1, wherein said refining molding unit comprises a cutter shaft adapted to receive a cutter tools attached to an end thereof, for cutting and refining a working piece disposed on said working platform.

12. The machine tool of claim 1, wherein said feeding means comprises a ball screw mechanism.

13. The machine tool of claim 1, wherein said feeding means comprises an oil pressure mechanism.

* * * * *